(12) United States Patent
Zobel

(10) Patent No.: US 9,208,388 B2
(45) Date of Patent: Dec. 8, 2015

(54) DRIVER ASSISTANCE SYSTEM FOR A MOTOR VEHICLE INCLUDING A CAMERA FOR DETECTING ROADWAY MARKINGS

(75) Inventor: Matthias Zobel, Wasserburg (DE)

(73) Assignee: Conti Temic Microelectronic GmbH, Nurnberg (DE)

( * ) Notice: Subject to any disclaimer, the term of this patent is extended or adjusted under 35 U.S.C. 154(b) by 124 days.

(21) Appl. No.: 13/390,543

(22) PCT Filed: Sep. 24, 2010

(86) PCT No.: PCT/DE2010/001124
§ 371 (c)(1),
(2), (4) Date: Mar. 22, 2012

(87) PCT Pub. No.: WO2011/042001
PCT Pub. Date: Apr. 14, 2011

(65) Prior Publication Data
US 2012/0185161 A1 Jul. 19, 2012

(30) Foreign Application Priority Data
Oct. 5, 2009 (DE) .......................... 10 2009 048 323

(51) Int. Cl.
*G08G 1/16* (2006.01)
*G06K 9/00* (2006.01)
*G08G 1/0962* (2006.01)

(52) U.S. Cl.
CPC ........ *G06K 9/00798* (2013.01); *G08G 1/09623* (2013.01); *G08G 1/09626* (2013.01); *G08G 1/167* (2013.01)

(58) Field of Classification Search
CPC .............. G06K 9/00798; G08G 1/167; G08G 1/09626; G08G 1/09623
USPC .................. 701/409, 117; 348/148–149, 143, 348/E07.085; 340/932.2
See application file for complete search history.

(56) References Cited

U.S. PATENT DOCUMENTS 6,694,259 B2 *  2/2004  Curbow et al. ............... 701/523
7,925,402 B2 *  4/2011  Fujimoto et al. ............... 701/45
(Continued)

FOREIGN PATENT DOCUMENTS

| DE | 102005029335 A1 | 4/2006 |
| DE | 102006007550 A1 | 11/2006 |
| DE | 102007001495 A1 | 7/2008 |
| EP | 0342345 A2 | 11/1989 |
| EP | 1887522 A1 | 2/2008 |

OTHER PUBLICATIONS

International Application U.S. Appl. No. PCT/DE2010/001124, International Search Report mailed Feb. 4, 2011, 6 pgs.
(Continued)

*Primary Examiner* — Nga X Nguyen
(74) *Attorney, Agent, or Firm* — RatnerPrestia

(57) ABSTRACT

The invention relates to a driver assistance system for a motor vehicle including a camera for detecting roadway marking. According to the invention a device is provided for detecting a parked or stopped mode of the vehicle. Furthermore, a control device receives image data of the surroundings of the vehicle from the camera in the parked or stopped mode and analyzes the image data with respect to roadway markings which indicate no-parking and/or no-stopping spots, wherein the control device controls a signaling device such that the signaling device outputs a warning message in the event that a roadway marking indicating a no-parking spot or a no-stopping spot is detected in the surroundings of the stopped or parked vehicle.

6 Claims, 1 Drawing Sheet

(56) References Cited

U.S. PATENT DOCUMENTS

| | | | |
|---|---|---|---|
| 2006/0215020 A1* | 9/2006 | Mori et al. | 348/119 |
| 2007/0057816 A1* | 3/2007 | Sakakibara et al. | 340/932.2 |
| 2009/0268947 A1* | 10/2009 | Schaufler | 382/104 |
| 2010/0253540 A1* | 10/2010 | Seder et al. | 340/905 |
| 2012/0188101 A1* | 7/2012 | Ganot | 340/932.2 |

OTHER PUBLICATIONS

Rahman, Mohammad Osiar, "Real Time Road Sign Recognition System Using Artificial Neural Networks for Bengali Textual Information Box", 2008 IEEE, 8 pgs.

\* cited by examiner

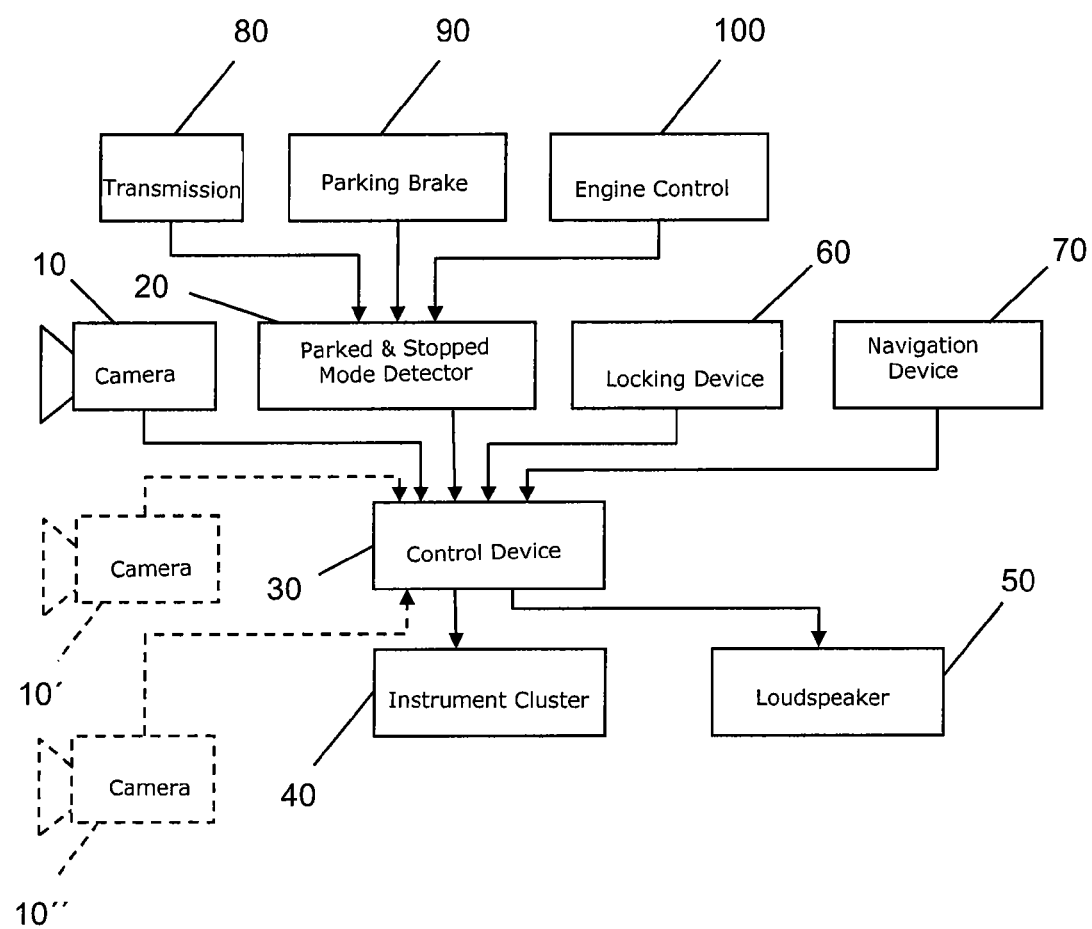

DRIVER ASSISTANCE SYSTEM FOR A MOTOR VEHICLE INCLUDING A CAMERA FOR DETECTING ROADWAY MARKINGS

CROSS REFERENCE TO RELATED APPLICATIONS

This application is a U.S. National Phase Application of PCT International Application No. PCT/DE2010/001124, filed Sep. 24, 2010, which claims benefit of priority from German Application No. 10 2009 048 323.3, filed Oct. 5, 2009. The contents of this application are incorporated herein by reference.

FIELD OF THE INVENTION

The invention relates to a driver assistance system for a motor vehicle including a camera for detecting roadway markings.

BACKGROUND OF THE INVENTION

Driver assistance systems include functions which assist the driver of a vehicle in his driving tasks. The aim of such systems is often to increase road safety by avoiding hazardous situations which can lead to accidents. Other goals are to increase comfort by relieving the driver as well as easier orientation by providing information on the surroundings which is processed depending on the specific situation and presented in a way which is suitable for the driver, such as is known, for example, for assistance systems including traffic sign recognition and/or lane detection or roadway marking detection.

Traffic sign recognition methods or roadway marking detection methods sense the surroundings in front of, next to or behind the vehicle by means of a camera, analyze the recorded image data and detect, in the image data, the presence of specific traffic signs or roadway markings of the lane the vehicle is in and possibly of neighboring lanes as well as the position of the vehicle relative to these roadway markings. This traffic sign and/or lane information can be used within a driver assistance system to warn the driver of overspeeding and/or of a lane departure or to decelerate the vehicle and/or keep it in its lane by means of intervening with the longitudinal and/or lateral control of the vehicle.

From DE 10 2006 007 550 A1, which is incorporated by reference, a driver assistance system including a method for detecting roadway markings is known, which determines the relative position of the vehicle in relation to the sensed roadway markings and warns the driver in the event that the roadway marking is crossed unintentionally. In this known method, especially the front areas of the vehicle and the lateral areas of the roadway or the lane are sensed.

SUMMARY OF THE INVENTION

Aspects of the present invention aim to further develop a driver assistance system including a camera for detecting roadway markings in such a manner that, in addition to the detection of lanes, the driver is provided with further useful information on the surroundings.

According to this, in a driver assistance system for a motor vehicle including a camera for detecting roadway markings, according to aspects of the invention a device is provided for detecting a parked or stopped mode of the vehicle, furthermore, a control device receives image data of the surroundings of the vehicle from the camera in the parked or stopped mode and analyzes said image data with respect to roadway markings which indicate no-parking and/or no-stopping spots, wherein the control device controls a signaling device such that the signaling device outputs a warning message in the event that a roadway marking indicating a no-parking spot or a no-stopping spot is detected in the surroundings of the stopped or parked vehicle.

Such an assistance system according to aspects of the invention enhances orientation of a driver in road traffic, in particular when parking his vehicle, since the driver is specifically provided with an indication if he wants to park his vehicle in a no-parking or a no-stopping spot, wherein this also comprises no-parking and no-stopping zones.

In particular with respect to a pilot project running in Hamburg until 2013, which aims at reducing the jungle of traffic signs in road traffic, the invention can effectively support the driver when searching for a parking spot, since in this pilot project, which, if successful, is to be extended to cover the entire territory of Germany, no-parking and no-stopping signs are to be replaced by solid yellow colored lines running along the edge of the roadway or curb. Such roadway markings could be provided at bus stops, loading zones and on bicycle safety lanes. Such colored lines could also be applied to the road next to bicycle paths as well as on multilane access and exit roads or in turning loops in dead-end streets in order to avoid an accumulation of traffic signs.

As a device for detecting the parked or stopped mode of the vehicle a detector can be used, for example, which detects the position of a selector lever of an automatic transmission when the vehicle is not moving, or a detector which monitors the operating state of a parking brake when the vehicle is not moving. Furthermore, also the engine control unit of the vehicle can serve as such a device, sending a corresponding signal to the control device when the engine is switched off.

The warning message is output optically and/or acoustically via a signaling device or a display device, wherein the instrument cluster of the vehicle can be such a signaling device or a loudspeaker of a radio or of a hands-free system is used for this purpose, for which loudspeaker the warning message can be processed, for example as a specific warning sound or, if the vehicle is provided with voice control, as a spoken warning indication.

According to an advantageous further development of an aspect of the invention, the image data of the surroundings of the vehicle are additionally analyzed by the control device in the parked or stopped mode of the vehicle also with respect to roadway markings which indicate parking and/or stopping zones, wherein the control device controls the signaling device or the display device such that a message is output optically and/or acoustically in the event that a roadway marking indicating a parking or stopping zone is detected. Thus, the driver is also informed if stopping or parking is allowed in a correspondingly marked area of the roadway.

According to a further development of an aspect of the invention, it is particularly advantageous if the control device controls the signaling device after a predetermined period of time has elapsed, preferably after three minutes in the state of the parked or stopped mode, because in a restricted-stopping spot, stopping up to three minutes is allowed, for example for loading, unloading or getting on or off a vehicle.

According to a further preferred further development of an aspect of the invention, a further device is provided which detects the process of the driver leaving the vehicle, wherein the control device controls the signaling device or the display device in the event that the further device detects that the vehicle is being left. The driver is thus warned on leaving the vehicle if his vehicle is parked at a no-parking spot or in a no-parking zone. This further device could be, for example, the locking device of the vehicle, which sends a corresponding signal to the control device if the vehicle is being locked.

It is particularly advantageous if the vehicle includes a position-finding device including a digital map, preferably a navigation device including a digital map, such that the surroundings of the vehicle are detected in the parked or stopped mode as a function of the location of the vehicle. In this manner, the assistance system according to the invention needs to be activated only in towns or cities, which makes orientation easier for the driver when searching for parking spots, in particular in larger cities. Moreover, it is possible to adjust the detection with respect to the colors or the structure of the markings of the no-parking or no-stopping spots to specific places, in particular also in view of different markings used in different countries.

The assistance system according to an aspect of the invention can be extended in an advantageous manner so as to represent a system including traffic sign recognition.

BRIEF DESCRIPTION OF THE DRAWING

The invention will now be explained in more detail with reference to the only figure, which shows a schematic block diagram of a circuit arrangement for the purpose of explaining the assistance system according to an aspect of the invention.

DETAILED DESCRIPTION

The assistance system according to the figure comprises at least one camera 10, which senses the surroundings in front of the vehicle and passes the image data on to a control device 30. In addition, cameras 10' and 10" can also be present, which detect the lateral area of the vehicle and are usually mounted inside the outside mirrors of the vehicle. The first-mentioned camera 10 is usually attached in a central position in the upper part of the windshield of the vehicle. Alternatively, it is also possible to use multiple cameras or image recording units with different viewing directions and installation positions.

The image data provided to the control device 30 are analyzed as to whether roadway markings indicating either a no-parking or no stopping spot or a no-parking or no-stopping zone are detected in a parked or stopped mode of the vehicle.

In order to determine the parked or stopped mode of the vehicle, a parked and stopped mode detector 20 is provided, which receives corresponding signals from an automatic transmission 80 and/or a parking brake 90 and/or an engine control 100, usually an engine control unit. The automatic transmission 80 provides a signal if the selector lever is in the parking position, the parking brake 90 provides a signal if the parking brake 90 is activated, and the engine control unit 100 provides a signal to the parked and stopped mode detector 20 if the engine is switched off.

If roadway markings indicating no-parking or no-stopping spots are detected by the control unit 30, a corresponding warning message is output optically and/or acoustically to a signaling device, here an instrument cluster 40 and/or a loudspeaker 50.

This warning message can also be output with a time delay, for example not earlier than three minutes after a parked and stopped mode of the vehicle has been detected, because in a restricted-stopping spot, stopping up to three minutes is allowed, for example for loading, unloading or getting on and off a vehicle.

It would also be possible to signal the warning message to the driver only on leaving the vehicle. For this purpose, a locking device 60 provides a corresponding signal to the control device 30 if it is detected that the vehicle is being locked.

The control device 30 can also be designed such that not only roadway markings indicating no-parking and no-stopping spots are detected, but also such roadway markings which allow stopping or parking. Thus, it can be additionally indicated to the driver via the instrument cluster 40 or the loudspeaker 50 that the vehicle is in an area of the roadway where parking or stopping is allowed.

If the vehicle is additionally provided with a navigation device 70 including a digital map, such as is illustrated in the figure, the function of detecting roadway markings indicating no-parking or no-stopping spots as a function of the location of the vehicle can be performed, for example only in towns or cities. Moreover, the detection can be adjusted to a specific place, for example with respect to the colors of the structure of no-parking and no-stopping spots or zones to be detected or also with respect to the pattern. Furthermore, it is also possible to adjust the detection to the different marking types of different countries.

The assistance system described here can ideally be extended by algorithms for traffic sign recognition. It is further advantageous to use the existing cameras for detecting roadway markings and thus to realize functions such as "lane detection", "lane keeping assistance" or "lane-change assist".

REFERENCE NUMERALS

10 camera
10' camera
10" camera
20 parked and stopped mode detector
30 control device
40 signaling device, instrument cluster
50 signaling device, loudspeaker
60 locking device
70 navigation device
80 transmission
90 parking brake
100 engine control

The invention claimed is:

1. A driver assistance system for a motor vehicle including a camera for detecting roadway markings, comprising:
   a device, located in the vehicle, for detecting a parking or stopping mode of the vehicle; and
   a control device, located in the vehicle, configured to:
   1) receive digital map data indicating a location of the vehicle, the location used to determine types of roadway markings associated with a specific place,
   2) receive image data of surroundings of the vehicle from the camera in the parking or stopping mode,
   3) specify analysis parameters of said image data based on the types of roadway markings associated with the specific place as indicated by the map data, and
   4) analyze said image data based on the specified analysis parameters to detect roadway markings which indicate i) a no-parking spot where parking is not permitted by law of the specific place, or a no-stopping spot where stopping is not permitted by law of the specific place, and ii) a parking spot where parking is permitted by law of the specific place, or a stopping spot where stopping is permitted by law of the specific place, wherein the control device, located in the vehicle, controls a signaling device, located in the vehicle based the analysis, such that the signaling device:
outputs a warning message to a driver of the vehicle in the event that a roadway marking indicating a no-parking spot or a no-stopping spot is detected in the surroundings of the stopping or parking vehicle, and
outputs another message to the driver of the vehicle in the event that a roadway marking indicating a parking spot or a stopping spot is detected in the surroundings of the vehicle.

2. The driver assistance system according to claim 1, wherein:
the control device controls the signaling device after a predetermined period of time has elapsed with the vehicle in the state of the parking or stopping mode.

3. The driver assistance system according to claim 2, wherein the predetermined period of time is at least three minutes.

4. The driver assistance system according to claim 1, comprising:
a further device detecting if the driver leaving the vehicle, wherein
the control device controls the signaling device if the further device detects that the driver is leaving the vehicle.

5. The driver assistance system according to claim 1, wherein the control unit detects surroundings of the vehicle in the parking or stopping mode only in towns and cities.

6. The driver assistance system according to claim 1, comprising a device to perform traffic sign recognition with the camera.

* * * * *